Oct. 1, 1929.   A. TEBALDI   1,730,306
VALVE
Filed Dec. 23, 1926
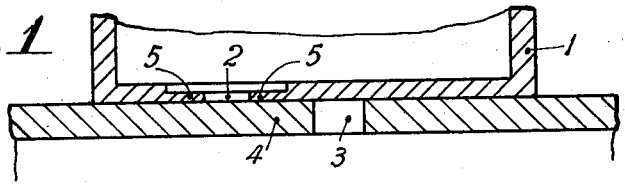
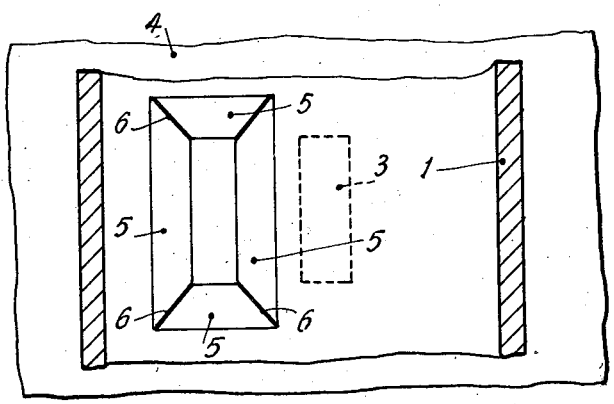
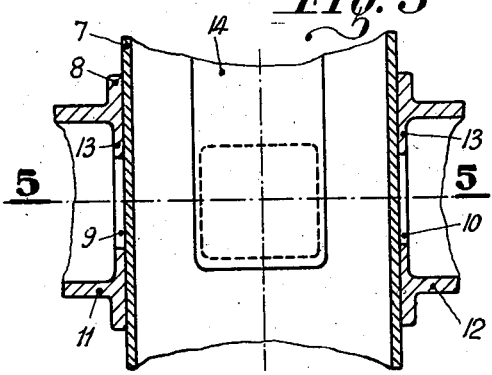
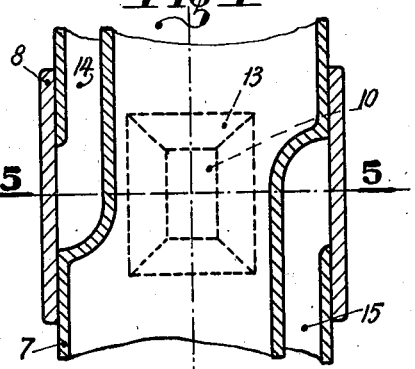
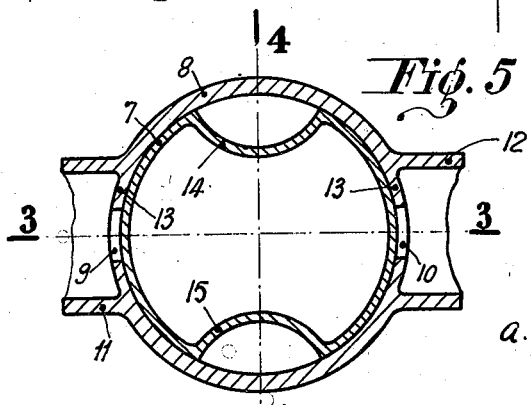

Patented Oct. 1, 1929

1,730,306

UNITED STATES PATENT OFFICE

ALESSANDRO TEBALDI, OF MILAN, ITALY

VALVE

Application filed December 23, 1926, Serial No. 156,731, and in Germany December 30, 1925.

It is known that in order to control the intercommunication of two spaces enclosing fluids at different pressures, shutters or valves are used which are adapted to move in contact with a stationary member having a port or ports, and a rotary or reciprocatory or both rotary and reciprocatory motions is or are imparted to them.

In the devices above referred to, the fluid tight connection or seal depends upon the pressure forcing the shutter or valve in contact with the stationary member having a port or ports for the flow of fluid (which may be gas, steam, water or the like) as well as upon lubrication of contacting surfaces of valve and stationary part and upon accuracy or smoothness of said surfaces.

The present invention has for its object an arrangement by which the seal of sliding or rotary valves or shutters is improved and a tight joint is obtained which may be compared with that obtainable by means of seat valves, that is valves having a head which is forced onto a seat.

For the above stated purpose in accordance with the present invention the periphery of the opening for the flow of fluid is made resilient and thus said periphery is adapted to be forced against the cooperating part under the action of fluid pressure, the contact between the cooperating seal surfaces being made independent from separate means (as springs used in known constructions) and proportional to the pressure of the fluid to be controlled.

On the annexed drawing are shown by way of example two embodiments of the present invention and Fig. 1 is a fragmentary diagrammatical section of a construction of slide valve according to the present invention;

Fig. 2 is a fragmentary plan view of the same;

Fig. 3 is a fragmentary central section of a rotary distributor on line 3—3 of Fig. 5;

Fig. 4 is a fragmentary central section of the same on line 4—4 of Fig. 5;

Fig. 5 is a transverse section on line 5—5 of Figures 3 and 4.

In Figures 1 and 2, 1 shows a portion of a casing in which a fluid under pressure is contained, and said casing is intended to be put at given times in communication with an outer space through a port 2 provided in it. Said port 2 is closed by the cooperation with a member 4 which has a port 3 adapted to register with said port 2, either of said parts 1 and 4 being actuated by any known or preferred means to reciprocate with respect to the other one.

As shown on the drawing the wall of the casing 1 is provided with portions 5 having reduced thickness with respect to the thickness of the wall of casing 1 contacting with said member 4, and said portions 5 encircle the port 2 to provide flexible blades or lips which bear on the surface of part 4 around the port 2.

Slots 6 are preferably provided over the periphery of said port 2, the lips 5 being thus separated from each other and free for independent flexures.

When a fluid pressure exists in casing 1, said pressure acts on lips 5 and forces them against the surface of part 4, thus securing a sealing action which depends upon the fluid pressure.

Said lips 5 may be interengaged or arranged to overlap on each other by sloping or other surfaces along the edges of splits 6 and they may have any desired cross section, as a decreasing or triangular cross section, to obtain a flexure of the same adapted to provide a proper fit throughout their whole extent on cooperating part 4.

In practice said casing 1 may be actuated in a manner similar to a slide valve by means of a reciprocatory part or a rotary crank and a connecting rod to control the intercommunication through port 3 of spaces enclosed by suitable means at opposite sides of partition 4, fluid under pressure being assumed to be supplied in the one of said spaces in which the slide casing 1 is located and then to be delivered to space beyond said partition through ports 2 and 3 at the time they register with each other.

In the embodiment of Figures 3, 4 and 5, a rotary distributor 7 is mounted to rotate in a drum 8, rotation being effected by any desired means not shown.

Said drum 8 has ports 9 and 10 opening into ducts 11 and 12 of larger size than said ports, and said ports are encircled by lips 13 which have a reduced thickness providing for their flexure and extend within respective ducts 11 and 12, intermediate said ducts and the space of drum 8 in which distributor 7 is mounted to rotate.

The distributor 7 has ducts 14 and 15 inside it, said ducts 14 and 15 being intended to come at given times into register with ports 9 and 10 for the flow of fluid therethrough.

Lips 13 may be separated by means of slots 6 as hereinbefore described.

In operation the pressure within ducts 11 and 12 acts on lips 13 to force them against the surface of the distributor 7 and secure the seal.

In this construction the rotary distributor 7 is intended to be rotated by any suitable means and to deliver through its ducts 14 and 15 a fluid under pressure to spaces to be supplied therewith, said supply being intermittently shut off and established by the cooperation of said distributor with its stationary casing or drum 8.

Of course the present invention is not restricted to constructions described and illustrated and it may be embodied in different manners within the spirit of the appended claims.

What I claim as my invention and desire to secure by United States Letters Patent is:—

1. In means for controlling the flow of a fluid under pressure, a part having a port, a second part subject to fluid pressure and having a port, said parts being arranged for respective movement in contact with each other to carry said ports into and out of register with each other, the edges of said port of said pressure bearing part having a reduced thickness and having slots to provide flexible lips adapted to be forced by said pressure against the surface of the first named respectively movable part to ensure the seal around said port.

2. In means for controlling the flow of a fluid under pressure, a part having a port, a unitary part subject to fluid pressure and having a port, said parts being arranged for respective movements in contact with each other to carry said ports in and out of register with each other, the edges of said port of said pressure bearing part being reduced in thickness to provide integral lips adapted to be forced by said pressure against the surface of the first named respectively movable part to ensure the seal around said port.

In testimony whereof, I affix my signature.

ALESSANDRO TEBALDI.